(12) United States Patent
Zernickel

(10) Patent No.: US 7,341,525 B2
(45) Date of Patent: Mar. 11, 2008

(54) LINEAR ROLLING BEARING FOR THE TRANSMISSION OF TORQUES

(75) Inventor: Alexander Zernickel, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 166 days.

(21) Appl. No.: 10/558,840

(22) PCT Filed: May 25, 2004

(86) PCT No.: PCT/EP2004/005588

§ 371 (c)(1),
(2), (4) Date: Dec. 16, 2005

(87) PCT Pub. No.: WO2004/106758

PCT Pub. Date: Dec. 9, 2004

(65) Prior Publication Data

US 2006/0269177 A1    Nov. 30, 2006

(30) Foreign Application Priority Data

May 30, 2003   (DE) ............................... 103 24 480

(51) Int. Cl.
  *F16D 3/06*   (2006.01)
(52) U.S. Cl. ........................ 464/168; 384/49
(58) Field of Classification Search ................ 384/43, 384/49, 52, 54, 55; 464/168; 280/775
  See application file for complete search history.

(56) References Cited

U.S. PATENT DOCUMENTS

| | | | |
|---|---|---|---|
| 2,791,894 A | 5/1957 | Duckworth | |
| 3,298,243 A * | 1/1967 | Geissler et al. | 464/168 X |
| 3,318,109 A | 5/1967 | Ressler et al. | |
| 3,356,424 A | 12/1967 | Edwards | |
| 3,449,927 A | 6/1969 | Field et al. | |
| 3,494,148 A | 2/1970 | Young | |
| 3,552,806 A | 1/1971 | Weasler et al. | |
| 4,311,348 A | 1/1982 | Olschewski | |
| 4,634,296 A * | 1/1987 | Watanabe | 464/168 X |

FOREIGN PATENT DOCUMENTS

| | | |
|---|---|---|
| DE | 2 142 965 | 3/1972 |
| DE | 2 244 075 | 3/1973 |
| DE | 2 164 543 | 5/1974 |
| DE | 199 33 875 A1 | 2/2001 |
| DE | 100 62 680 A1 | 6/2002 |
| DE | 101 50 595 A1 | 4/2003 |

* cited by examiner

*Primary Examiner*—Greg Binda
(74) *Attorney, Agent, or Firm*—Lucas & Mercanti, LLP

(57) ABSTRACT

The linear rolling bearing for transmitting torques about its longitudinal axis has an inner profile element and an outer profile element a first circulatory channel having roller bodies and a second circulatory channel having roller bodies. Each circulatory channel having a loadbearing channel, a return channel, and two deflection channels which connect the loadbearing channel and the return channel to one another in an endless manner. The inner profile has longitudinal teeth and each circulatory channel is positioned between separate teeth. The loadbearing channel of both the first and second circulatory channel bear against the same tooth. The first and second circulatory channel can transmit torque in the same direction by changing the return channel to a load bearing channel such that there are two loadbearing channels both on different teeth.

19 Claims, 2 Drawing Sheets

LINEAR ROLLING BEARING FOR THE TRANSMISSION OF TORQUES

FIELD OF THE INVENTION

The present invention relates to a linear rolling bearing for transmitting torques.

BACKGROUND OF THE INVENTION

Linear rolling bearings of transmitting torque are used in virtually all areas of mechanical engineering and motor vehicle technology. Parts which can be displaced longitudinally with respect to one another can be mounted with bearings of this type. In applications with shafts whose lengths can be adjusted telescopically, a bearing of this type has to additionally transmit the torques which are passed through the shaft. Shafts whose length can be adjusted telescopically are used, for example, as steering shafts of steering columns of modern motor vehicles, In steering columns of this type, the position of the steering wheel in the passenger compartment can be adapted to the individual size and posture of the operating person. In this way, the absolute spacing of the steering wheel with respect to the steering gear is changed. This change in spacing can be corrected by two shaft ends which are arranged inside one another so as to be displaceable telescopically.

For example, DE 199 33 875 A1 discloses a linear rolling bearing with two profile elements that can be displaced satisfactorily in the longitudinal direction with respect to one another. This is achieved by the rolling mounting, the rolling bodies circulating in endless circulatory channels. Torques of small magnitude can be transmitted between the two profile elements via the rolling bodies. However, if the prevailing torque exceeds a critical value, the two profile elements rotate at least by a small rotational angle with respect to one another under resilient work, wall sections of both profile elements coming into contact with one another. The magnitude of the torque which is still transmitted via the rolling bodies can be defined by the design of the compressing elements. Above a critical torque, at any rate, the transmission takes place via the abovementioned contacts of the wall sections of the two profile elements with one another. In this known linear rolling bearing, the rolling bodies circulate in first and in second circulatory channels. Both circulatory channels have a loadbearing channel which is parallel to the longitudinal axis, torques or radial loads below the critical torque being transmitted between the two profile elements via the rolling bodies which are arranged in the loadbearing channel. Furthermore, said circulatory channels have a return channel which is parallel to the longitudinal axis and in which the rolling bodies return without load. The return channel and the loadbearing channel are connected to one another in an endless manner via deflection channels, with the result that the rolling bodies can circulate endlessly. The rolling bodies which are arranged in the loadbearing channel of the first circulatory channel can transmit torques in one rotational direction. The rolling bodies which are arranged in the loadbearing channel of the second circulatory channel can transmit torques in the opposite direction between the two profile elements.

Although the contact of the wall sections of the two profile elements with one another ensures that the rolling bodies of the two circulatory channels are not exposed to any excessively high loadings as a result of overcritical torques, it is to be noted that a simultaneous relative displacement of the two profile elements with respect to one another in the longitudinal direction is possible above the critical torque only with friction work. This is because sliding friction is caused during the contact of the wall sections, a frictional force being a function of the prevailing torque.

OBJECT OF THE INVENTION

It is therefore an object of the present invention to specify a linear rolling bearing in which a relative displacement of the two profile elements in the longitudinal direction is also possible without problems under torque loading.

SUMMARY OF THE INVENTION

According to the invention, this object is achieved by the fact that the first circulatory channel and the second circulatory channel can be connected to one another for jointly transmitting torques, the return channel of the circulatory channel which can be respectively connected being used as a loadbearing channel and the loadbearing channel of the circulatory channel which can be respectively connected being used as a return channel.

In the linear rolling bearing according to the invention, the sliding contact of the profile elements is absent at torques above a critical torque. Even torques above the critical torque are transmitted exclusively via the rolling bodies between the two profile elements. The contrivance of the invention is to be seen in the fact that, in both rotational directions above the critical torque, the forces which occur are transmitted not only by the rolling bodies of the first or the second circulatory channel, but by the rolling bodies of the two circulatory channels. In other words, the invention can be described by the fact that, below a critical torque, substantially only the loadbearing channel of the first or of the second circulatory channel is provided for transmitting the torque, the return channel of the respective other circulatory channel being provided additionally above the critical torque as a loadbearing channel for transmitting this torque, and the loadbearing channel of said other circulatory channel being provided as a return channel. Therefore, only a reversal of the loadbearing channel and the return channel takes place in the connected circulatory channel.

The first or second circulatory channel can be connected to the respective other circulatory channel in different ways. In one variant which is preferred in accordance with the invention, a rotational angle (even if it is small) of the two profile elements with respect to one another about the longitudinal axis is a function of the prevailing torque, a critical rotational angle being exceeded above the critical torque, at which critical rotational angle the return channel is used as a loadbearing channel and the loadbearing channel is used as a return channel in the circulatory channel which is connected. Accordingly, below this rotational angle, the conditions in the loadbearing channel and in the return channel of the connected circulatory channel change, as will be explained in the following text.

In a known way, the loadbearing channel and the return channel are delimited in each case by an outer raceway for the rolling bodies, which outer raceway is assigned to the outer profile element, and by an inner raceway for the rolling bodies, which inner raceway is assigned to the inner profile element. The same is also true for the deflection channels of the two profile elements which are delimited in each case by an outer deflection track which is assigned to the outer profile element and by an inner deflection track which is assigned to the inner profile element.

Likewise in a known manner, the rolling bodies are arranged without play in the loadbearing channel, in roller contact with the raceways which delimit the loadbearing channel. It is ensured in this way that there is no rotational play between the two profile elements. Furthermore, the rolling bodies are arranged in the return channel with play with respect to the raceways which delimit the return channel. This is necessary, in order that the balls can be returned as far as possible without friction, in order to be deflected into the loadbearing channel again.

According to the invention, the play of the rolling bodies in the return channel of the circulatory channel which can be connected is reduced during the rotation (even if it is small) of the two profile elements with respect to one another. Furthermore, the play of the rolling bodies, with respect to the raceways, in the loadbearing channel of the circulatory channel which can be connected is increased during the rotation. This influencing of the play of the rolling bodies in the return channel and in the loadbearing channel is possible in arrangements with a first and with a second circulatory channel, the first circulatory channel being provided for transmitting torques in one rotational direction, and the other circulatory channel being provided for transmitting torques in the opposite rotational direction.

In a linear rolling bearing according to the invention which is preferred from a technical and economic viewpoint, the outer profile element can have a hollow body and the inner profile element can have a shaft, a plurality of segments which are distributed over the circumference and delimit the circulatory channels together with the shaft being provided between the hollow body and the shaft. Every segment can be provided with the two raceways which are arranged parallel to one another, and with two deflection tracks which connect said raceways to one another. Segments of this type can be manufactured, for example, as a punched part cheaply. As a result of the provision of a plurality of segments, even small relative movements of the segments in the circumferential direction with respect to one another can be made possible, in order to avoid stressing between the two profile elements within the permissible tolerances.

The hollow body can be, for example, a tube, or else a sleeve or a ring.

Every segment can be supported on the hollow body in order to transmit a torque. For this purpose, the outer raceway can be configured as a ball groove on that side of the segment which faces the shaft, a convex shaped-out molding of the segment being formed on its side which faces the hollow body. Said convex shaped-out molding of the segment can bear against a rest of the hollow body in order to transmit a torque. If the segment is manufactured from a metal plate with an identical wall thickness, that side of the metal sheet which faces the shaft can be provided with the ball groove which corresponds to a concave recess, the abovementioned convex shaped-out molding being produced by this pressing in of the recess on that side of the segment which faces the hollow-cylindrical body.

The hollow body can be provided with a plurality of shaped recesses which are distributed over the circumference, project radially inwardly and form the rests for the segments in order to transmit a torque.

The shaft is preferably provided with a plurality of teeth which are distributed over the circumference, are arranged parallel to the longitudinal axis and on which the raceways are formed. The raceways are preferably formed as ball grooves.

Teeth which are adjacent to one another delimit in each case a convexly curved circumferential section between them. This circumferential section which is as a rule partially cylindrical can delimit the deflection channel as a deflection track for the rolling bodies.

According to the invention, the hollow body can be deformed resiliently in a particularly advantageous manner. This property makes it possible in a simple manner to rotate the two profile elements with respect to one another, a resilient deformation of the hollow body being associated with this rotation. If the torque is removed again, the hollow body is deformed back again, with the result that the initial position is reached again.

Another possible way of implementing the invention can provide, for example, spring elements which are arranged between the segments and the hollow body, the segments being supported in the circumferential direction by the hollow body via the spring elements.

BRIEF DESCRIPTION OF THE DRAWINGS

In the following text, the invention will be explained in greater detail using an exemplary embodiment which is illustrated in a total of two figures, in which.

DETAILED DESCRIPTION OF THE DRAWINGS

Figure 1:
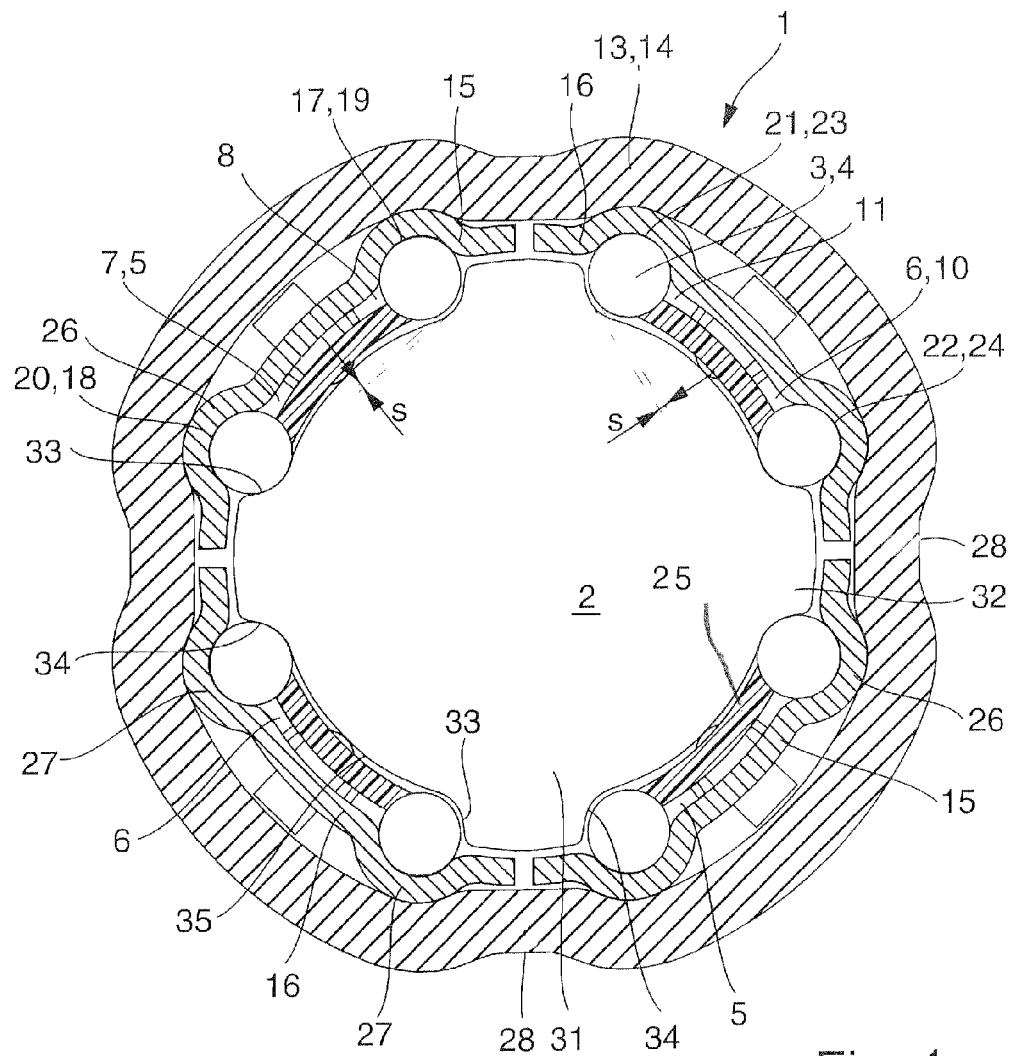
FIG. 1 shows a cross section through a linear rolling bearing according to the invention.
Figure 2:
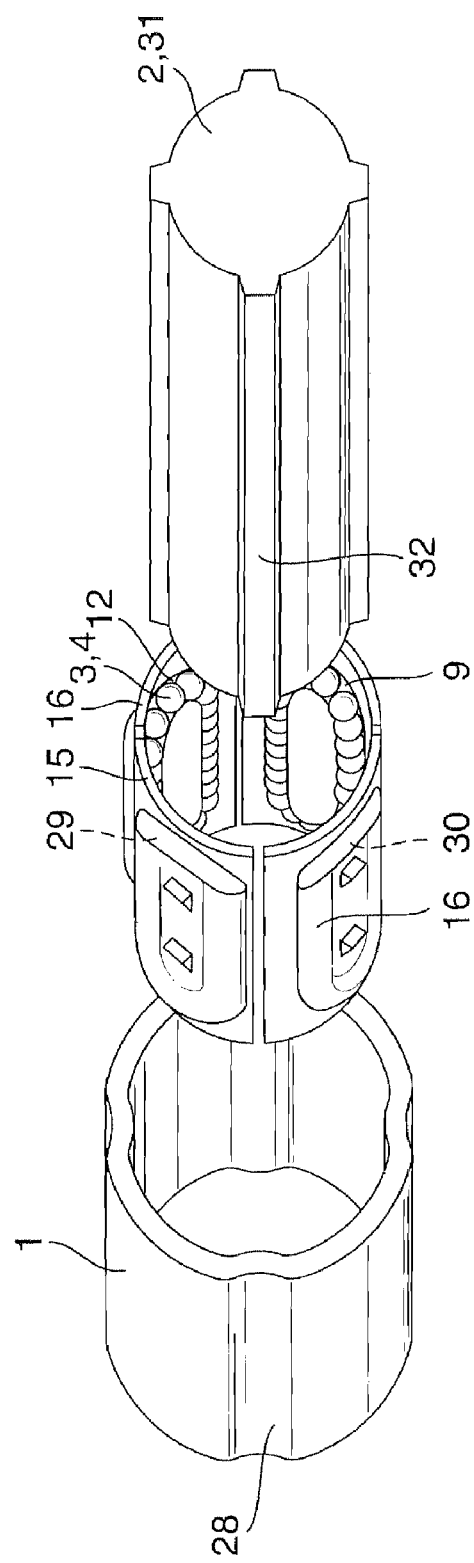
FIG. 2 shows the linear rolling bearing according to the invention from FIG. 1, in an exploded illustration in perspective.

The linear rolling bearing according to the invention which is illustrated in FIGS. 1 and 2 has an outer profile element 1 and an inner profile element 2. Rolling bodies 3 which are preferably configured as balls 4 are arranged between the two profile elements 1, 2. The balls 4 circulate endlessly in two first circulatory channels 5 and in two second circulatory channels 6, the two first circulatory channels 5 and the two second circulatory channels 6 lying diametrically opposite one another. The first circulatory channel 5 comprises a loadbearing channel 7 which is arranged parallel to the longitudinal axis of the linear rolling bearing, a return channel 8 which is likewise arranged parallel to the longitudinal axis of the linear rolling bearing, and two deflection channels 9 which connect the loadbearing channel 7 to the return channel 8 in an endless manner and which can be seen clearly in FIG. 2.

The second circulatory channel 6 comprises a loadbearing channel 10 which is arranged parallel to the longitudinal axis, a return channel 11 which is arranged parallel to the longitudinal axis, and two deflection channels 12 which connect the loadbearing channel 10 and the return channel 11 to one another in an endless manner.

The outer profile element 1 is composed of a hollow body 13 which is configured as a tube 14 in the present case, and further of four segments 15, 16 which are distributed over the circumference, two segments 15 being assigned to the first circulatory channel 5 and two segments 16 being assigned to the second circulatory channel 6. It can be gathered clearly from FIG. 2 that the segments 15, 16 are each provided with an endless ball track for the balls 4. On their sides which face the inner profile element 2, the segments 15 are provided with raceways 17, 18 which are configured as ball grooves 19, 20 in the present case. The ball grooves 19 delimit the return channel 8, and the ball grooves 20 delimit the loadbearing channel 7. In a corresponding manner, the segments 16 are provided, on their sides which face the inner profile element 2, with raceways 21, 22 which are configured as ball grooves 23, 24 in the present case. The ball grooves 23 delimit the return channel 11 of the second circulatory channel 6, and the ball grooves 24 delimit the loadbearing channel 7 of the second circulatory channel 6.

In each case one cap 25 which is provided as a captive securing means for the balls 4 is arranged between the loadbearing channel 7 and the return channel 8 of every circulatory channel 5, 6. If the outer profile element 1 is pulled off from the inner profile element 2, the balls 4 cannot fall out inwardly from the outer profile element 1, as the caps 25 catch the balls 4 underneath. In normal operation of the linear rolling bearing according to the invention, the caps 25 are not necessarily required, and could also be removed.

Every segment 15, 16 has an annularly closed endless pressed-in portion, as can be seen in the perspective illustration of FIG. 2 on the outer side of the segments 15, 16. Said pressed-in portions form the above-described ball grooves 19, 20, 23, 24 on the sides which face the inner profile element 2. The segments 15, 16 have approximately the same wall thickness over their entire extent. Accordingly, convex shaped-out moldings 26, 27 correspond to the pressed-in portions on the inner side of the segments 15, 16, the shaped-out moldings 26 being formed on the segments 15 and, from them, the shaped-out moldings 27 being formed on the segments 16.

The tube 14 is provided with a plurality of shaped recesses 28 which are distributed over the circumference and project radially inwardly, in each case one of said shaped recesses 28 being arranged between two shaped-out moldings 26, 27 of two segments 15, 16 which are arranged next to one another. It can be seen clearly from FIG. 1 that the shaped-out moldings 26, 27 are supported on the shaped recesses 28 in the circumferential direction.

It can be seen clearly from FIG. 2 that deflection tracks 29 are formed on the segments 15, as a result of the above-mentioned pressed-in portions, and deflection tracks 30 are formed on the segments 16 for the balls 4, the deflection tracks 29, 30 connecting the ball grooves 19, 20, 23, 24 of the respective segments 15, 16 to one another in an endless manner.

In the present case, the inner profile element 2 is formed by a shaft 31. Said shaft 31 has four teeth 32 which are distributed over the circumference and project radially outward out of the cylindrical face of the shaft 31, every tooth 32 being arranged parallel to the longitudinal axis and being formed along the shaft 31. In each case one tooth 32 engages between two first and second circulatory channels 5, 6 which are arranged next to one another. It can be seen clearly from FIG. 1 that, starting from the top and rotating in the clockwise direction, the first tooth 32 engages between two return channels 8, 11 of the first and the second circulatory channel 5, 6, that the next tooth 32 engages between two loadbearing channels 7, 10 of the first and the second circulatory channel 5, 6, that the next (i.e. lowermost) tooth 32 engages between two return channels 8, 11, and that the last tooth 32 engages between two loadbearing channels 7, 10 again.

In each case one ball groove 33, 34 is formed on both longitudinal sides of every tooth 32, the ball groove 33 being assigned to the second circulatory channel 6 and the ball groove 34 being assigned to the first circulatory channel 5. The ball grooves 33, 34 delimit in each case the return channels 8, 11 or the loadbearing channels 7, 10.

Two teeth 32 which are arranged next to one another delimit in each case one cylindrical circumferential section 35 of the shaft 31. Said cylindrical circumferential section 35 delimits the deflection channel 9, 12. The balls 4 roll along said cylindrical circumferential section 35, in order to pass from the return channel 8, 11 into the loadbearing channel 7, 10.

The balls 4 are arranged without play in the loadbearing channels 7, 10. This means that there is no play in the rotational directions between the outer profile element 1 and the inner profile element 2.

The tube 14 of the outer profile element 1 is configured and dimensioned in such a way that it can be deformed under the action of a prevailing torque.

In the following text, the method of operation of the linear rolling bearing according to the invention will be explained in greater detail using FIG. 1. Initially, it is to be assumed that there is no torque, that is to say no torque is being transmitted between the two profile elements 1, 2. The outer profile element 1 is displaced longitudinally with respect to the inner profile element 2 as the balls 4 roll on the ball grooves 20, 24, 33, 34 of the loadbearing channels 7, 10. It can be seen from FIG. 1 that the play S is formed in the return channels 8, 11, that is to say the balls 4 can return satisfactorily. If then, for example, a torque is introduced into the shaft 31 in the clockwise direction, this torque is transmitted by the balls 4 which are arranged in the loadbearing channels 7 of the first circulatory channels 5. In the illustration according to FIG. 1, these are the balls 4 of the first and third quadrants. If a torque is introduced into the shaft 31 in the counterclockwise direction, this torque is transmitted by the balls 4 which are arranged in the loadbearing channels 10 of the second circulatory channels 6. In the illustration according to FIG. 1, these are the balls 4 of the second and fourth quadrants. As long as the magnitude of the torques remains considerably below a critical value, the situation remains largely as shown in FIG. 1. This means that the play S is formed in the return channels 8, 11 as before.

If a torque above a critical magnitude is then introduced into the shaft 31 in the clockwise direction, although the forces which are produced are introduced into the tube 14 from the shaft 31 via the balls 4 as before, the magnitude of the forces which occur in the contact of the convex shaped-out moldings 26 of the segments 15 with the shaped recesses 28 of the tube 14 is so great that the tube 14 yields elastically outward under this force. In the further course, accordingly, a relative rotation (even if it is small) of the shaft 31 with respect to the tube 14 takes place in the clockwise direction. As a consequence of this relative rotation, the play S in the return channels 11 of the second circulatory channels 6 is reduced, in the second and fourth quadrants. At the same time, a play is produced for the balls 4 in the loadbearing channels 10 of the second circulatory channel 6. In FIG. 1, these are the balls 4 in the loadbearing channels 10 in the second and fourth quadrants. Finally, the play S is canceled in the return channel 11 of the second circulatory channel 6, and the balls 4 are clamped under load between the ball grooves 34 of the shaft 31 on one side and the ball grooves 23 of the segments 16 on the other side. In this situation, the torque is accordingly transmitted by the balls 4 of all the circulatory channels 5, 6. Accordingly, above the critical torque, the arrangement of the return channel 8, 11 and of the loadbearing channel 7, 10 is reversed in the second circulatory channel 6 which has been connected. This reversal occurs during rotation of the two profile elements 1, 2 with respect to one another, a play originally formed in the return channels 8, 11 being canceled and, in contrast, a play being produced in the loadbearing channels 7, 10.

It goes without saying that, in a corresponding way, torques above a critical magnitude can be introduced into the shaft 31 in the counterclockwise direction, a corresponding reversal of the loadbearing channels and return channels of the circulatory channels which are connected taking place.

LIST OF REFERENCE NUMERALS

1 Outer profile element
2 Inner profile element
3 Rolling body
4 Balls
5 First circulatory channel
6 Second circulatory channel
7 Loadbearing channel
8 Return channel
9 Deflection channel
10 Loadbearing channel
11 Return channel
12 Deflection channel
13 Hollow body
14 Tube
15 Segment
16 Segment
17 Raceway
18 Raceway
19 Ball groove
20 Ball groove
21 Raceway
22 Raceway
23 Ball groove
24 Ball groove
25 Cap
26 Shaped-out molding
27 Shaped-out molding
28 Shaped recess
29 Deflection track
30 Deflection track
31 Shaft
32 Tooth
33 Ball groove
34 Ball groove
35 Cylindrical circumferential section

The invention claimed is:

1. A linear rolling bearing for transmitting torques about its longitudinal axis, comprising:
    an inner profile element;
    an outer profile element which surrounds the inner profile element at least partially;
    the inner profile element and the outer profile element being mounted via rolling bodies such that the inner profile element and the outer profile element are displaceable with respect to one another in the longitudinal direction;
    the rolling bodies circulate endlessly in at least one first circulatory channel and in at least one second circulatory channel;
    each of the first and second circulatory channels having a loadbearing channel which is parallel to the longitudinal axis, a return channel which is parallel to the longitudinal axis, and two deflection channels which connect the loadbearing channel and the return channel to one another in an endless manner;
    the rolling bodies which are arranged in the loadbearing channel of the first circulatory channel being provided for transmitting a torque between the inner profile element and the outer profile element in a clockwise direction;
    the rolling bodies which are arranged in the loadbearing channel of the second circulatory channel being provided to transmit a torque between the inner profile element and the outer profile element in a counter clockwise direction, wherein
    the first circulatory channel and the second circulatory channel jointly transmitting torques in the same direction when either the return channel of the second circulatory channel becomes a loadbearing channel and loadbearing channel of the second circulatory channel becomes a return channel or the return channel of the first circulatory channel becomes a loadbearing channel and the loadbearing channel of the first circulatory channel becomes a return channel.

2. The linear rolling bearing as claimed in claim 1, wherein only the loadbearing channel of the first or second circulatory channel transmit torque below a critical torque, and the return channel of the respective other circulatory channel acts as a loadbearing channel for transmitting torque above the critical torque, and the loadbearing channel of said other circulatory channel acts as a return channel.

3. The linear rolling bearing as claimed in claim 1, wherein,
    a rotational angle of the inner profile element and the outer profile element with respect to one another about the longitudinal axis is a function of the prevailing torque, a critical rotational angle being exceeded above a critical torque, at which critical rotational angles, the return channel is used as a loadbearing channel and the loadbearing channel is used as a return channel in each of the first and second circulatory channel.

4. The linear rolling bearing as claimed in claim 1, wherein,
    the loadbearing channel and the return channel are delimited in each case by an outer raceway for the rolling bodies, the outer raceway is assigned to the outer profile element, and by an inner raceway for the rolling bodies the inner raceway is assigned to the inner profile element.

5. The linear rolling bearing as claimed in claim 4, wherein the rolling bodies are arranged in the return channel with play S with respect to raceways which delimit the return channel.

6. The linear rolling bearing as claimed in claim 5, wherein the play S of the rolling bodies in the return channel of each of said first and second circulatory channel is reduced during a rotation of the two profile elements with respect to one another.

7. The linear rolling bearing as claimed in claim 4, wherein the rolling bodies are arranged without play in the loadbearing channel, in roller contact with raceways which delimit the loadbearing channel.

8. The linear rolling bearing as claimed in claim 7, wherein play of the rolling bodies, with respect to the raceways, in the loadbearing channel increases during a rotation of the inner profile element and the outer profile element with respect to one another.

9. The linear rolling bearing as claimed in claim 1, wherein each of the two deflection channels are delimited by an outer deflection track which is assigned to the outer profile element and by an inner deflection track which is assigned to the inner profile element.

10. The linear rolling bearing as claimed in claim 1, wherein the outer profile element is a hollow body, and the inner profile element is a shaft, and a plurality of segments are distributed over the shaft, each segment delimiting one of each of the first and second circulatory channel and the segments provided between the hollow body and the shaft.

11. The linear rolling bearing as claimed in claim 10, wherein each of the segments are provided with the two outer raceways which are arranged parallel to one another, and with two deflection tracks which connect said outer raceways to one another.

12. The linear rolling bearing as claimed in claim 11, wherein the outer raceway comprises a ball groove which faces the shaft, and a convex shaped-out molding which faces the hollow body.

13. The linear rolling bearing as claimed in claim 12, wherein the shaped-out molding bears against a rest of the hollow body in order to transmit a torque.

14. The linear rolling bearing as claimed in claim 13, wherein the hollow body has a plurality of shaped recesses each of which project radially inwardly and form the rest.

15. The linear rolling bearing as claimed in claim 10, wherein each of the segments is supported on the hollow body in order to transmit a torque.

16. The linear rolling bearing as claimed in claim 10, wherein the shaft has a plurality of longitudinal teeth and raceways are formed on the teeth.

17. The linear rolling bearing as claimed in claim 16, wherein the teeth which are adjacent to one another delimit a convexly curved circumferential section of the shaft.

18. The linear rolling bearing as claimed in claim 17, wherein the circumferential section delimits each of the deflection channels for each of the first and second circulatory channel.

19. The linear rolling bearing as claimed in claim 10, wherein the hollow body is resiliently deformable.

* * * * *